United States Patent [19]

Cheng

[11] Patent Number: 5,725,890

[45] Date of Patent: Mar. 10, 1998

[54] MECHANISM FOR FORMING A DISTAL FACE OF A FIBER-OPTICS

[76] Inventor: Yu-feng Cheng, No. 7, Fuhsing St., Tucheng Ind. Dist., Tucheng City, Taipei Hsien, Taiwan

[21] Appl. No.: 707,715

[22] Filed: Sep. 4, 1996

[51] Int. Cl.⁶ .................. B29C 51/18; B29C 51/42
[52] U.S. Cl. .................. 425/384; 264/293; 264/320; 425/385; 425/392; 425/403
[58] Field of Search .................. 425/384, 385, 425/392, 403, 403.1, DIG. 218; 264/293, 320

[56] References Cited

U.S. PATENT DOCUMENTS

| | | | |
|---|---|---|---|
| 3,323,569 | 6/1967 | Benischek | 425/385 |
| 3,649,144 | 3/1972 | Breck, Jr. | 425/385 |
| 4,480,892 | 11/1984 | Sexstone et al. | 425/385 |
| 5,051,083 | 9/1991 | Coluzzi | 425/385 |
| 5,312,240 | 5/1994 | Divone, Sr. et al. | 425/392 |

Primary Examiner—Jay H. Woo
Assistant Examiner—Joseph Leyson
Attorney, Agent, or Firm—Sixbey, Friedman, Leedom & Ferguson; Stuart J. Friedman

[57] ABSTRACT

A mechanism for forming a distal face of a fiber-optic core uses a motor to drive a lifter which has an upper protrusion and a lower protrusion. A first seat having a fiber-optic core-securing clamp provided thereon and a second seat having a heater are forced to move upward and downward, respectively, by the upper protrusion and the lower protrusion until the heater and core engage a mirror plate with a plurality of recesses provided therein. By virtue of moving the first seat and the second seat with the lifter, the heater heats the mirror plate and, after the first seat descends and engages the core with the mirror plate, a distal face of the fiber-optic core is formed as a male equivalent of the recesses of the mirror plate.

4 Claims, 5 Drawing Sheets

MECHANISM FOR FORMING A DISTAL FACE OF A FIBER-OPTICS

FIELD OF THE INVENTION

The present invention generally relates to a mechanism structure, and more particularly to a mechanism structure especially used for forming a tip of a fiber-optic conductor.

BACKGROUND OF THE INVENTION

Referring to FIG. 8, a structure of a prior socket 90 for fiber-optics is shown. The socket 90 has an axial through hole 91 for receiving a fiber-optic conductor 92. The conductor 92 comprises a core 920, an inner insulator 921 and an outer insulator 922. A predetermined length of the core 920 protrudes from the front of the socket 90 after the core 920 is inserted into the hole 91 of the socket 90. Because a fiber-optic conductor which transmits signals through light behaves differently from other types of conductors made of materials such as copper, good conduction of light depends greatly on the angle of a distal face of the fiber-optic conductor. The angle of the distal face of the conductor determines where the transmitted signals are projected. Therefore, a conventional fiber-optic conductor which is cut manually to form the distal face cannot meet the special requirements of transmitting signals in a specific direction. Accordingly, the distal face of the fiber-optic conductor 92, as shown in FIG. 8, needs to go through a process called "MIRROR", after the completion of the connection between the conductor 92 of fiber-optics and the socket 90.

This so-called "MIRROR" process is where a distal end of a fiber-optic core 920 engages with an arcuate recess defined on a "mirror", after the mirror is heated up to a certain temperature which is high enough to melt the core 920, then the distal end of the core 920 will be formed as a male equivalent shape of the female recess.

When a fiber-optic conductor undergoes the "MIRROR" process, every step, such as heating time of the "mirror", engaging time of the core with the "mirror", etc, is controlled manually. This manual-control of heating time of the "mirror" or the engaging time of the core with the "mirror" is not efficient and will cause great inaccuracy in forming the shape and the angle of the distal face. Thus, the mechanism constructed in accordance with the present invention tends to mitigate and/or obviate the aforementioned problems.

SUMMARY OF THE INVENTION

The main objective of the invention is to provide a mechanism which will automatically form a distal face of a fiber-optic core. The mechanism comprises one upper plate and one lower plate which is disposed at the lower front side of the upper plate. A controlling means is mounted on the upper plate for controlling a fiber-optic conductor to move in a required direction. A heater is mounted on a lower face of the mechanism for heating up a "mirror" which is provided on the lower plate and configured to have a plurality of recesses therein. By means of the controlling means, the fiber-optic conductor will automatically be transported to the lower plate and engaged with the recesses of the mirror after the mirror is heated up by the heater. Thus, the distal face of the conductor will be melted and shaped as a male equivalent of the female recesses because of the heat of the "mirror".

Another objective of the invention is to provide a plurality of air blowers immediately adjacent to the "mirror" to reduce the temperature of the conductor before the conductor leaves the "mirror".

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

Figure 1:
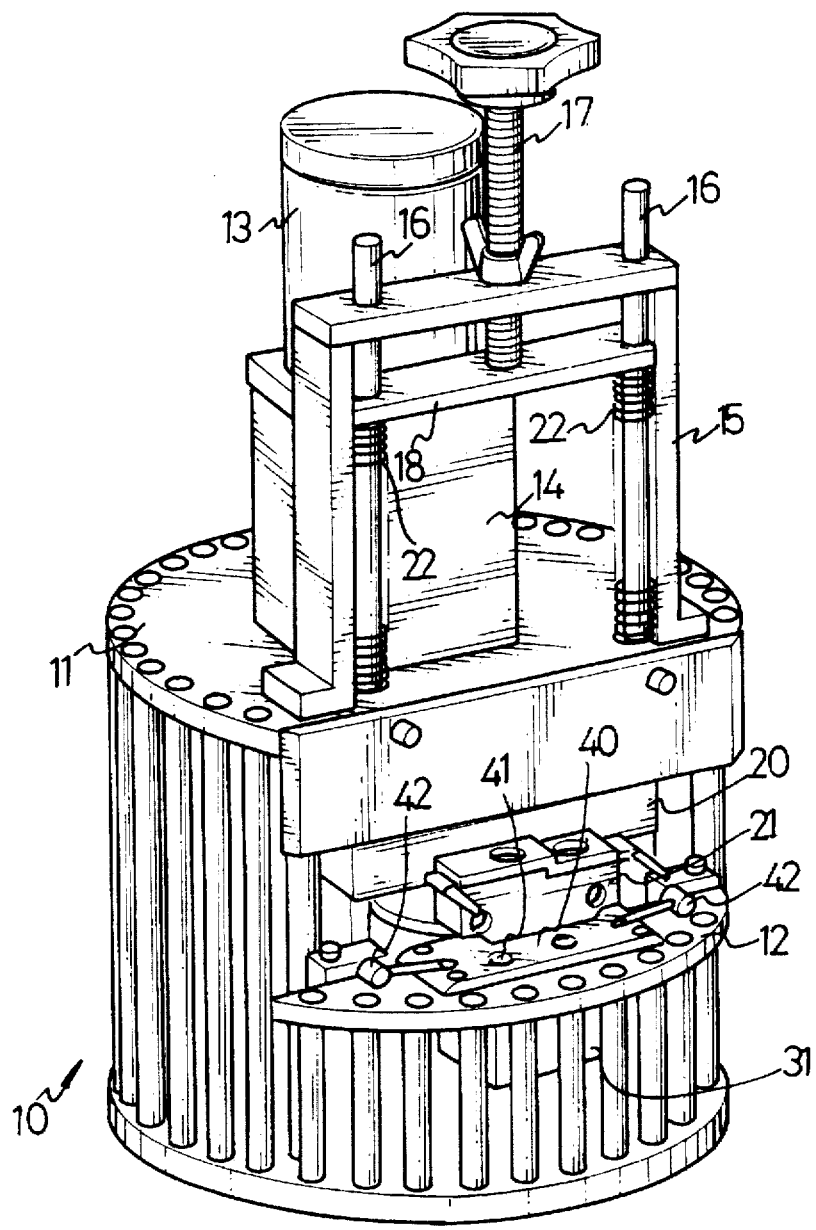
FIG. 1 is a perspective view of a mechanism constructed in accordance with the present invention.

Referring to FIG. 1, one preferred embodiment of a base 10 of the invention is shown. The mechanism comprises a base 10, an upper plate 11 securely connected with the base 10 by a plurality of rods (not numbered) and having a gear reduction box 13 and a motor 14 mounted thereon and a lower plate 12 disposed on a front lower portion of the upper plate 11 and securely attached to the rods. An inverted "U" shaped frame 15 is mounted on a front edge of the upper plate 11 and includes a pair of posts 16 respectively provided on two opposing sides and an adjusting rod 17 provided on the center. The two posts 16 are fixedly mounted on the base 10 and have an adjusting plate 18 provided therebetween. The adjusting plate 18 is securely yet rotatably attached to the adjusting rod 17 at a first end thereof.

Figure 3:
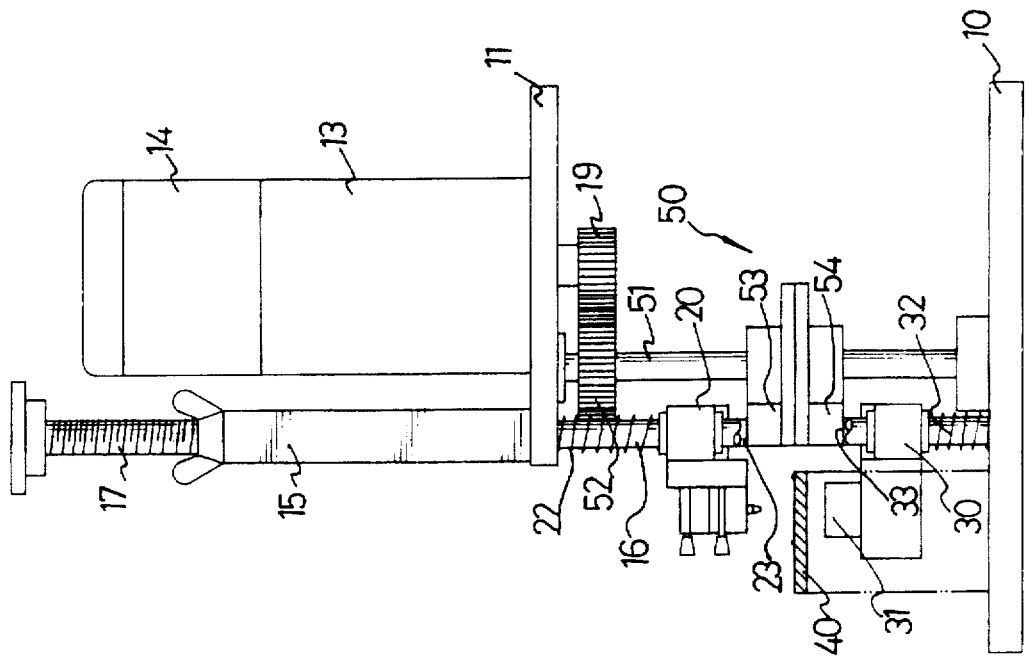
FIG. 3 is a side view of the mechanism.
Figure 2:
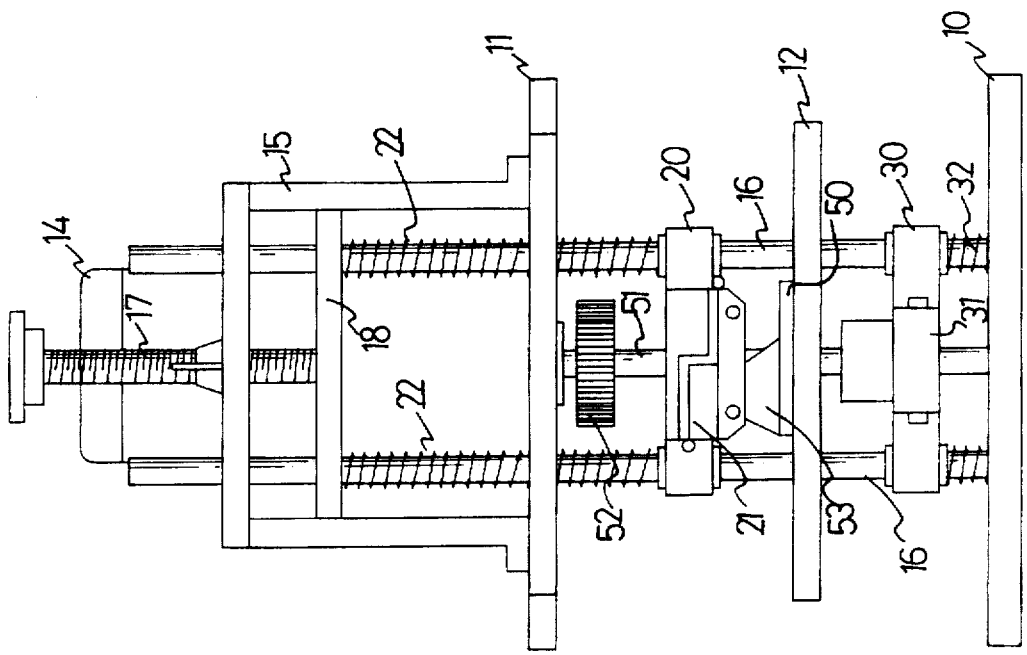
FIG. 2 is a plan view of the mechanism.

Referring to FIG. 2 and FIG. 3, a first seat 20 and a second seat 30 are securely fixed right below the upper plate 11 by the two posts 16. A first bearing 23 and a clamp 21 for securing a conductor of fiber-optics (not shown) are respectively provided on a bottom face and an outer edge of the first seat 20. A second bearing 33 and a heater 31 for heating up a mirror-plate 40 on the lower plate 12 are respectively provided on a center top face and an outer edge of the second seat 30. A first spring 22 is provided on the respective post 16 between the first seat 20 and the adjusting plate 18. Thus the first seat 20 is enabled to have a downward movement ability. The resilience of the first spring 22 is adjusted by means of using the adjusting rod 17 to adjust the distance between the adjusting plate 18 and the first seat 20. Two second springs 32 are respectively provided on each of the posts 16, under the second seat 30, thus the second seat 30 is enabled to have an upward movement ability.

Referring again to FIG. 1, a plurality of recesses 41 corresponding to a lower portion of the clamp 21 and an upper direction of the heater 31 are defined on the mirror plate 40.

Referring to FIG. 3, a lifter 50 having an axle 51 pivotally connected between the bottom of the upper plate 11 and a top of the base 10 is provided behind the lower plate 12 and under the upper plate 11. The axle 51 further has a first gear 52 provided on a predetermined location thereof.

Figure 5:
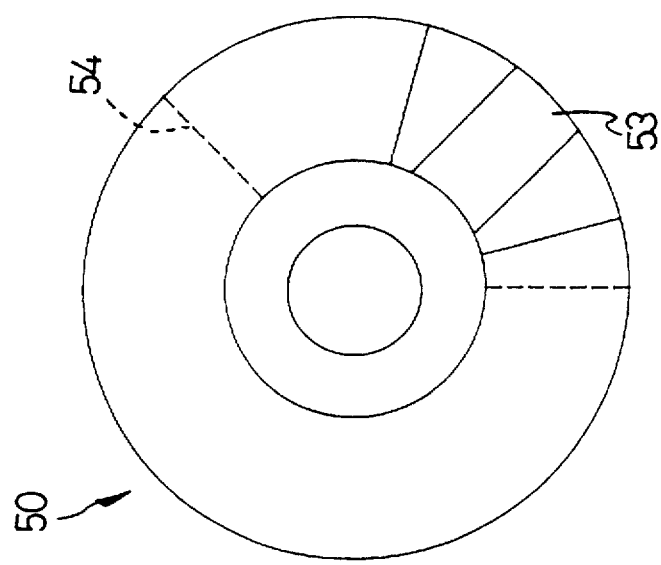
FIG. 5 is a top view of the lifter.
Figure 4:
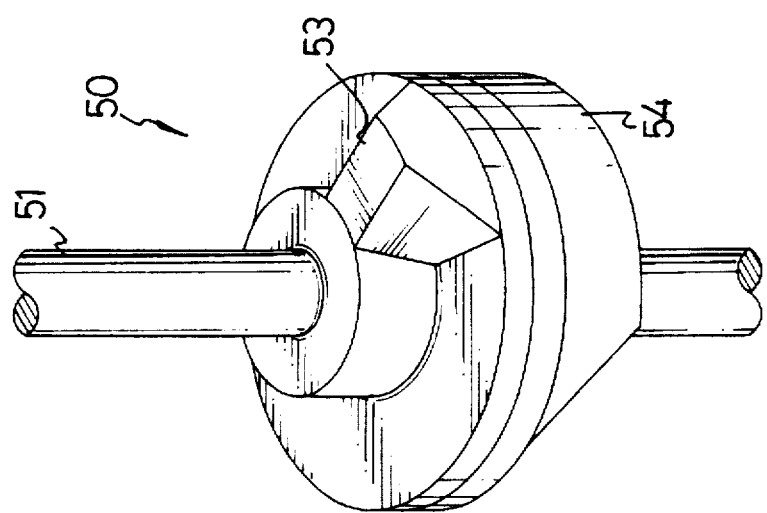
FIG. 4 is a perspective view of a lifter.

Referring to FIG. 4, the lifter 50 is configured as a circular disk and has an upper protrusion 53 on an upper face and a lower protrusion 54 on a lower face thereof. Both the upper protrusion 53 and the lower protrusion 54 are provided to have slopes on both end faces thereof. The upper protrusion 53 is provided on the upper peripheral face between 112.5°–157.5° and the lower protrusion 54 is provided on the lower peripheral face around 45°–180°, therefore the upper protrusion 53 and the lower protrusion 54 are superposed to each other within the range of 112.5°–157.5°, as shown in FIG. 5.

As described earlier, the upward movement and downward movement of the first seat 20 and the second seat 30 are controlled by the lifter 50.

Referring again to FIG. 3, a second gear 19 mated with the first gear 52 of the axle 51 of the lifter 50 is provided on an output end of the gear reduction box 13, such that the lifter 50 is driven by the gear reduction box 13 through the first gear 51 and the second gear 19. Because the lifter 50 is mounted between the first seat 20 and the second seat 30, the rotation of the lifter 50 will cause the upper protrusion 53 and the lower protrusion 54 to engage with the first bearing 23 of the first seat 20 and the second bearing 33 of the second seat 30. Accordingly, the first seat 20 will gradually be pushed upward and the second seat 30 will gradually be pressed downward by the slope of both the upper protrusion 53 and the lower protrusion 54 and the clamp 21 and the heater 31 will be moved simultaneously.

Referring to FIG. 1, an air blower 42 is respectively provided on both sides of the mirror plate 40, so that the conductor of fiber-optics will effectively be cooled down after the so called "MIRROR" process is completed.

From the preferred embodiment of the present invention, it is noted that two conductors may be used to face the recesses 41 of the mirror plate 40 simultaneously on the clamp 21 to form the distal face through the "MIRROR" process. When the motor 14 is not running, the clamp 21 and the heater 31 are respectively pushed away by the upper protrusion 53 and the lower protrusion 54, as shown in FIG. 3.

Figure 6:
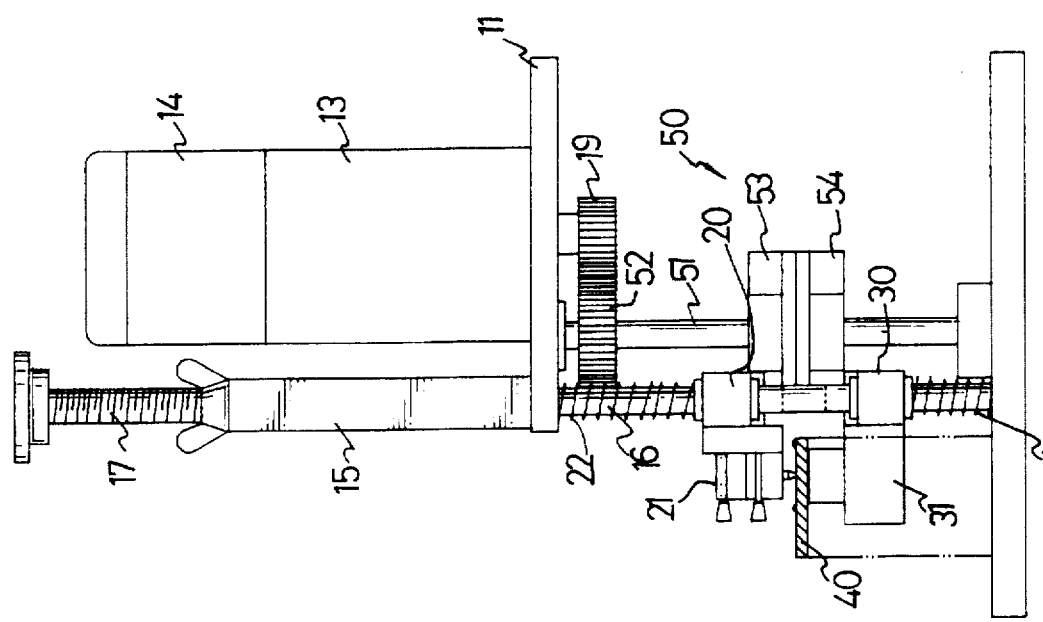
Figure 8:
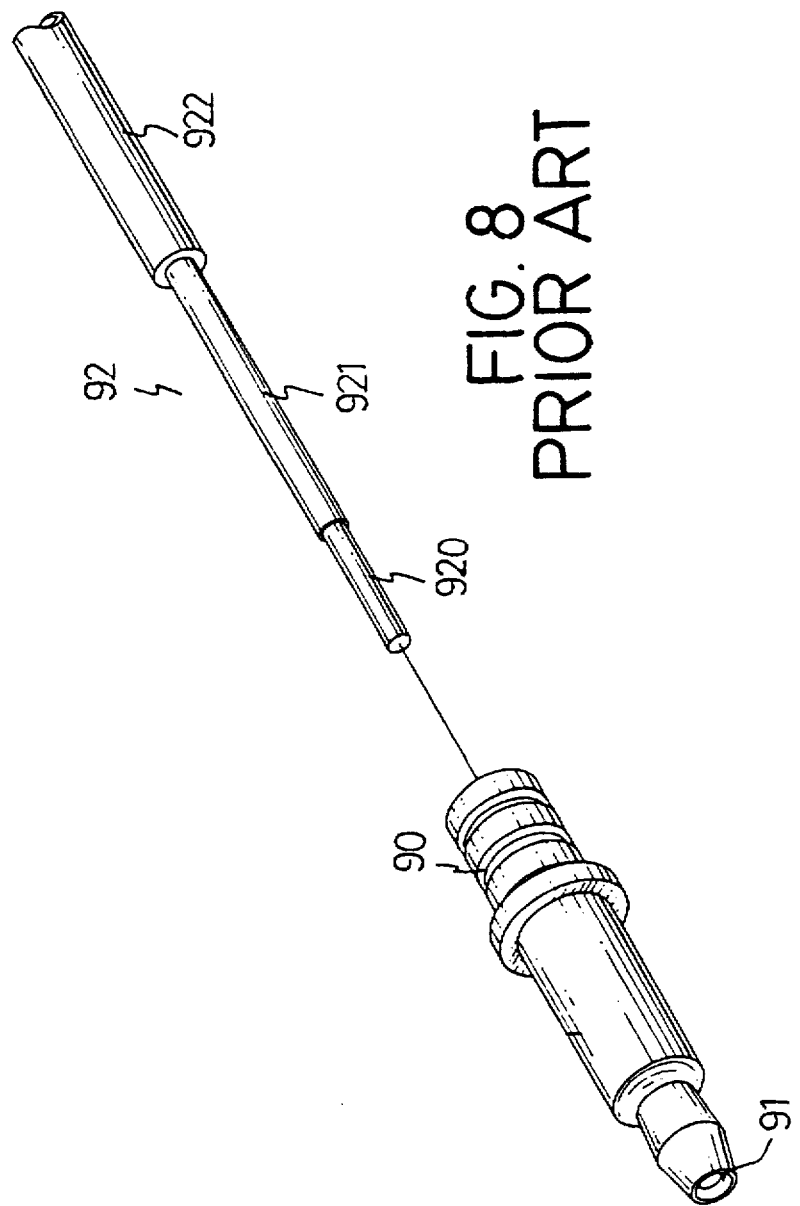
FIG. 8 is an exploded view of a prior art conductor.

After the motor 14 starts to run, the lower protrusion 54 will first leave the engagement with the heater 31, and the heater 31 moves upward due to the resilience of the second spring 32 and thus engages with the mirror plate 40. As the lifter 50 begins to rotate, the upper protrusion 53 will gradually leave the engagement with the clamp 21 and therefore the conductor(s) of fiber-optics (not shown) securely held by the clamp 21 become(s) engaged with the recesses of the mirror plate 40 due to the resilience of the first spring 22, as shown in FIG. 6.

Figure 7:
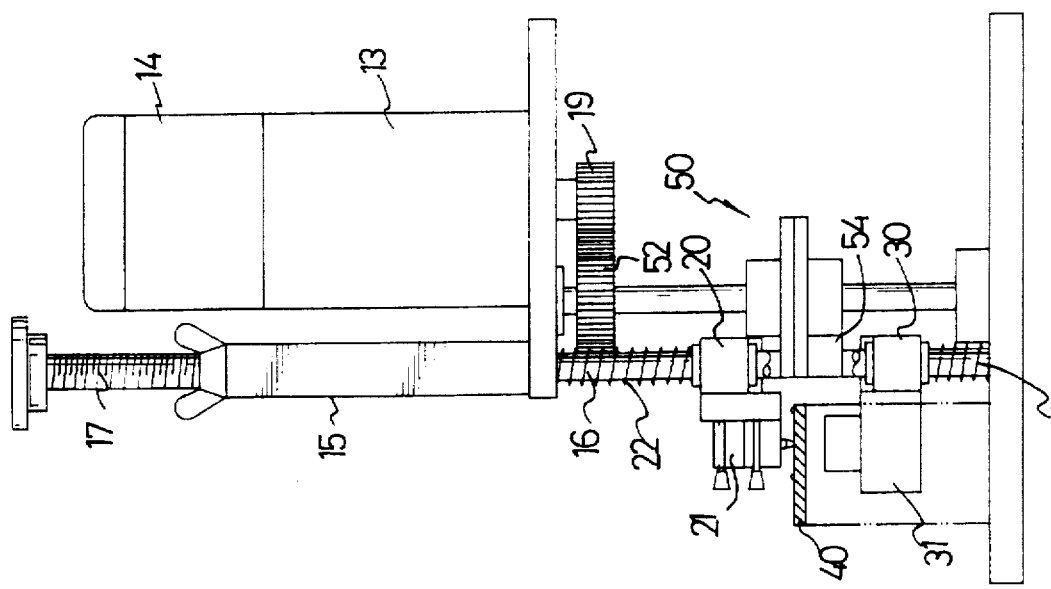
FIG. 6 and FIG. 7 are schematic views of the invention showing the movement of the mechanism.

As the lifter 50 continues to rotate because of the motor 14, the lower protrusion 54 will again become engaged with the heater 31 and then press the heater 31 to leave the bottom face of the mirror plate 40, as shown in FIG. 7. Meantime the air blower 42 will reduce the temperature of the mirror plate 40 and also the temperature of the conductor. The clamp 21 together with the conductor is then pushed away by the upper protrusion 53 and a cycle of the mirror process is completed.

It is to be noted that the engaging time between the conductor of fiber-optics and the mirror plate 40 and the heating time of the heater 31 to the mirror plate 40 are both controlled automatically, which increases the speed of forming the distal face of the conductor of fiber-optics and reduces inaccuracy of the distal face of the conductor.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A mechanism for forming a distal face of a fiber-optic core comprising:

a base having a plurality of rods;

an upper plate securely connected to said base by said rods;

a gear reduction box mounted on said upper plate and having a motor mounted thereon;

a frame mounted on said upper plate and having two posts provided on two sides thereof and mounted on said base, an adjusting rod inserted at the center of the frame and an adjusting plate abutted by said adjusting rod and extending between said two posts;

a lower plate securely connected with said posts and disposed below and in front of said upper plate, said lower plate having a mirror plate which has a plurality of recesses defined therein;

a first seat provided between said upper plate and said lower plate and movably mounted on said posts, said first seat having a clamp therein;

a second seat provided between said lower plate and said base and movably mounted on said posts;

two first springs provided between said adjusting plate and said first seat on both of said posts;

two second springs provided between said second seat and said base on both of said posts;

a heater securely provided on said second seat; and a lifter having an axle pivotally connected between said upper plate and said base, an upper protrusion fixedly mounted with said axle and adjacent to said first seat for causing movement of said first seat when the axle is rotated and a lower protrusion fixedly mounted with said axle and adjacent to said second seat for causing movement of said second seat when the axle is rotated, said axle having a first gear, and a second gear provided on an output end of said gear reduction box and mated with said first gear.

2. The mechanism as claimed in claim 1 further comprising a plurality of air blowers provided on said lower plate and beside said clamp of said first seat.

3. The mechanism as claimed in claim 1, wherein said upper protrusion and said lower protrusion are peripherally superposed at a certain range.

4. The mechanism as claimed in claim 3, wherein said range is between 112.5°–157.5°.

* * * * *